United States Patent Office 2,719,179
Patented Sept. 27, 1955

2,719,179

BRANCHED-CHAIN CARBOHYDRATE POLYMERS AND THEIR PREPARATION

Peter Tibor Mora, West Chester, Pa., and Eugene Pacsu, Princeton, N. J.

No Drawing. Application January 25, 1951, Serial No. 207,842

26 Claims. (Cl. 260—209)

This invention relates to the preparation of branched-chain carbohydrate polymers of high molecular weight. More particularly, it relates to branched-chain polysaccharides of high molecular weight and to their preparation. Still more particularly it relates to a process of polymerizing saccharides which contain from 1 to 10 saccharide nuclei under conditions such that branched-chain saccharide polymers of high molecular weight are obtained.

Various carbohydrate polymers are known but they, for the most part, are linear polymers when the molecular weights are above 5,000. These polymers are generally naturally-occurring although some linear polymers have been made by synthetic methods. The known methods of polymerizing saccharides utilize elevated temperatures and lead to polymers which are made from decomposition products of the monomers rather than the saccharide monomers and they cannot be reconverted into the original saccharides by hydrolysis methods. These polymers have a degree of polymerization of well below 15 and are accompanied by various degradation products as well as large amounts of unchanged monomers.

An object of this invention is to provide a new class of branched-chain polymers of saccharides. A further object is to provide such saccharides which are of high molecular weight and have a molecule which does not exhibit orientation along a single axis. Another object is to provide a practical method for preparing branched-chain polysaccharides. Yet another object is to provide a method whereby such polysaccharides can be obtained in commercial quantities. Still other objects will be apparent from the following description of the invention.

It has been discovered that saccharides having 1 to 10 saccharide units in a linear chain and at least three reactive radicals wherein 2 to 3 of the radicals are free hydroxyl groups and one radical may be a hydroxyl-yielding group taken from the class consisting of hemiacetal, acetal and ether groups and preferably such saccharides containing three free hydroxyl groups in each saccharide unit of 4 to 7 carbon atoms and having a free hydroxyl group on the number 1 carbon atom can be readily polymerized to produce a new and useful class of branched-chain polysaccharides by heating such a saccharide or a mixture of saccharides in an inert solvent or diluent in the presence of 0.01% to 5.0% of an acid catalyst at a temperature from $-80°$ C. and below to about $110°$ C. and higher and under a reduced pressure of $10^{-5}$ to 100 mm. of mercury for a period varying from about two minutes to 72 or more hours and removing the volatile compounds from the polymer. The condensation reaction produces a mixture of branched-chain polysaccharides of varying molecular weights which can be recovered as solids and usually they are glasslike and non-crystalline in character. The reaction mixture contains in addition to the polysaccharide, water and the solvent used as the reaction medium, if it is not aqueous, and the acid catalyst. The water must be substantially removed before the polymerization reaction is completed in order to obtain and recover branched-chain polysaccharides without significant degradation. This may be accomplished by carrying out the condensation or polymerization reaction under such conditions that water and volatile substances, e. g., the solvent distilled off during the condensation, or by heating the freshly formed lower polymers in the same or a different vessel at reduced pressure, e. g., from $10^{-5}$ to 15 mm. of mercury and removing the volatile products from the polysaccharide. The temperature in the second stage may vary over the same range as in the first stage of the polymerization reaction described above. The polymerization reaction and removal of the volatile products can, of course, be accomplished in a single stage operation, but it is preferably done on a commercial scale in two stages. The crude polysaccharides can be treated with an alkaline material to remove the remaining acid catalyst impurities or alternatively the acid solution can be treated with an ion-exchange resin to remove the acidic and/or other impurities.

The crude branched-chain polysaccharides produced by the above methods consist of a mixture of polysaccharides of different polymerization degrees and different average molecular weights. The lower polymers in the mixture have a molecular weight over 2,500 and the higher have a molecular weight which may extend to 1,000,000. Fractions of polysaccharides with different molecular weights can be separated from the crude polymer mixture by dialysis and also they can be fractionally precipitated from solvents. During the dialysis through a non-plasticized cellophane membrane, for example, the molecules having a lower molecular weight about 8,000 are eliminated and only those molecules remain in the solution which have a molecular weight over about 8,000. Fractional precipitation from an aqueous solution of the polysaccharide results in the separation of an insoluble precipitate having a higher average molecular weight than the starting crude polysaccharide mixture. Using, for example, methyl alcohol to precipitate the polysaccharide from an aqueous solution, the amount of the water and the methyl alcohol and the temperature during the precipitation will be the deciding factors as to the particular average molecular weight on the fraction which will be precipitated. Using more water and less methyl alcohol and a higher temperature, the higher molecular weight fraction will separate as the precipitate. Consecutive fractional precipitations can be used for the separation of higher and higher molecular weight fractions. The more insoluble fraction in water has a main molecular weight over 500,000.

It has been discovered that saccharides having 1 to 10 saccharide units in a linear chain and at least three reactive radicals wherein two of the radicals are free hydroxyl groups and one of the radicals is a hydroxyl-yielding group taken from the class consisting of hemiacetal, acetal and ether groups and preferably such saccharides which contain three free hydroxyl groups in each saccharide unit of 4 to 7 carbon atoms and having a free hydroxyl group on the number 1 carbon atom can be polymerized by the procedure. The invention is not limited to saccharides which are unsubstituted on the remaining hydroxyl groups although the unsubstituted saccharides are preferred but includes the inner ethers and anhydrides and other derivatives. For instance, the hydrogen atom on one or more of the hydroxyl groups in the 2-, 3-, 4-, 5-, 6-, and/or 7- positions can be replaced by various low molecular weight groups including alkyl groups of 1 to 4 carbon atoms; allyl, benzyl; acyl groups of 2 to 18 carbon atoms, e. g., acetyl, hexadecanoyl, octadecanoyl, benzoyl, galloyl, tosyl, mesyl, etc., nitric acid ester groups, carbonate groups and phosphate groups. One or more of the hydroxyl groups of the saccharide units may be replaced by an amino or substituted amino group.

The acid catalyst should be used in an amount of 0.01% to 5.0% by weight of the amount of saccharide to be polymerized. Suitable catalysts include hydrochloric acid, phosphoric acid, phosphorous acid, sulfuric acid, aluminum chloride, zinc chloride, stannic chloride, boron trifluoride, antimony trichloride, p-toluene sulfonic acid, etc. These acid compounds can be characterized as "Lewis acids." They are electron acceptors and include not only those compounds that yield protons but also those substances which have only six electrons in their outermost valence shell (ref. G. N. Lewis "Valence and Structure of Atoms and Molecules," p. 141, pub. by The Chemical Catalog Co., New York (1923)).

Among the saccharides which can be polymerized by the above procedures are simple sugars, including mono-, di-, tri-, tetra-saccharides, e. g., D-glucose, D-mannose, D-galactose, D-fructose, D-allose, D-altrose, D-gulose, D-talose, D-idose and the corresponding L-compounds, L-arabinose, maltose; D-xylose, cellobiose, 3,6-sorbitan, 2,5-anhydrosorbitol, 2,3,4-, and 2,4,6- and 2,3,6-trimethyl glucoses, 2,3- and 2,4- and 2,6- and 3,4- and 3,6- and 4,6-dimethyl glucoses, 2- and glucose 3- and 4- and 6- monomethyl glucoses, 2,3,6-tribenzoyl glucose, 3,4,6-tri-acetyl-D-mannose, 2,3-diacetyl-6-nitro glucose, 2,3,5,6-dicarbonate mannofuranose glucose, 3- and 4- and 5- monophosphates, 2-desoxy-2-amino glucose, 2-desoxy-2-aminogaloctose, etc.

The polysaccharides of this invention, as stated above, have a non-linear, highly branched-chain structure. This structure is typified in the case of the 6-carbon atom saccharide polymers, e. g., D-glucose, D-mannose, D-fructose, D-allose, D-gulose, D-talose, D-idose, D-galactose and the correspond L-compounds by describing the linkages between adjacent saccharide units in the polymer. One of the saccharide units is connected to a second saccharide unit through a hemiacetal, acetal or ether linkage which joins the 1-carbon atom of said saccharide unit to any one of the 2-, 3-, 4-, or 6-carbon atoms of the adjacent saccharide unit or units. The frequency of the different linkages is determined by the reactivity of the different hydroxyl groups in the respective units which are approximately as follows: 2-hydroxyl 13.6%, 3-hydroxyl 15.2%, 4-hydroxyl 14.8%, and 6-hydroxyl 46.1%. It is to be understood that any of the two adjacent saccharide units can be 3- or 4-way branched to a third and fourth saccharide unit, the linkages occurring on those carbon atoms which were not involved in the original linkages just referred to. The frequency of the 3-way branching can be determined by a methylation and hydrolysis procedure described below. The polymers containing units of six carbon atoms are characterized in that nearly every third or fourth saccharide unit has a 3- or 4-way or more branch, that is, it is linked to three or four or more of other saccharide units.

The polysaccharides of this invention have a 3-dimensional structure and the molecules possess a somewhat spherical configuration as compared with the known linear polysaccharides. The polysaccharides have a molecular weight of at least 3,240 and a polymerization degree of at least 20. Branched-chain polysaccharides having an average molecular weight of at least 8,100 are preferred. The average molecular weight of fractions of the polysaccharides may extend to 250,000 and more.

The invention will be further illustrated but is not intended to be limited by the following examples.

*Example I*

Ten (10) grams of D-glucose (dextrose) was dissolved in 10 cc. of water, three drops of concentrated hydrochloric acid added and the solution was cooled to $-78.5°$ C. in a glass reaction vessel which was provided with means for reducing the pressure. During the polymerization a thin layer of polyglucose formed over a large area of the surface of the glass reaction vessel. The polyglucose which formed was a glass-like solid and the water and part of the acid used as original reactants and the water formed during the condensation (polymerization reaction) were removed through an outlet by maintaining the reaction vessel under a reduced pressure between $10^{-4}$ to $10^{-5}$ mm. of mercury at a temperature of $-78.5°$ C. for a period of 120 hours. Ten grams of a dry mixture of polyglucoses was recovered which had an average polymerization degree of about 50. It was purified by dissolving it in 10 cc. of water which contained sufficient sodium bicarbonate to neutralize the included hydrochloric acid. The solution was added to 500 cc. of methanol with stirring and 7.4 grams of a white powdery precipitate separated which had a melting point of 238–242° C.; specific rotation $[\alpha]_D^{20} = 87.3$ and the absorption peak at 2800 Å. It readily dissolved in water but was insoluble in methanol, ethanol and diethyl ether. The molecular weight (determined by osmotic pressure and light scattering measurements) was 25,000 which corresponds to a polymerization degree of about 150. Still higher fractions can be separated by precipitation as described in the following example.

*Example II*

An aqueous solution containing 50% D-glucose (dextrose), 49% water and 1% of concentrated hydrochloric acid by weight was evaporated in a vacuum drum dryer at a temperature from 80 to 100° C. at a pressure from 10 to 15 mm. Hg for a period of two to six minutes whereby a brittle glass-like polymer was obtained. This polymer was found to be readily soluble in water except for a very small fraction of a very high molecular weight. In order to eliminate the remaining water and to complete the polymerization, the polyglucose recovered from the drum dryer was powdered and dried for ten days over phosphorus pentoxide under a reduced pressure less than 3 mm. Hg at about 0° C.

A portion of the branched-chain polyglucose obtained from the drum drying process described above was dissolved in water containing a sufficient amount of sodium bicarbonate to neutralize the hydrochloric acid which was occluded by the solid glass-like polymer. The pH was maintained between 7 and 8 during this treatment to avoid acid hydrolysis of the polysaccharide.

The solution was dialyzed for a period of ten days into a stream of water through a thin membrane of an undried, freshly regenerated cellulose which was free from a plasticizer. At the end of the period the mixture of polysaccharides remaining had an average molecular weight of more than 12,000. The dialyzed solution was concentrated under reduced pressure to about the same volume as before dialysis. A 100 cc. portion of the solution was added with stirring to 5 liters of methanol and the solid white polymer which precipitated was filtered, washed with absolute methanol and then with diethyl ether and dried. It was soluble in water, had a molecular weight of about 25,000 (a degree of polymerization of about 150 determined by osmotic pressure and light scattering measurements). Its specific rotation is $[\alpha]_D^{20} = 87.3$ and the absorption in ultraviolet has the peak around 2800 A. This white powder is stable at room temperature and pressure for an indefinite period and melts with decomposition at 238 to 242° C. It was readily soluble in water but insoluble in methanol, ethanol, higher alcohols, acetone, and diethyl ether. By similar precipitation methods further and still higher fractions can be separated. In an aqueous solution it is uneffected by enzymes, but with strong mineral acids can be hydrolyzed back to glucose in a quantitative yield.

*Example III*

An aqueous solution containing 70% of D-glucose (dextrose), 29% water and 1% of concentrated hydrochloric acid by weight was evaporated in a vacuum drum dryer at a temperature from 92 to 96° C. at a pressure from 1 to 6 mm. Hg for one to three minutes and a brittle, glass-like mixture of polyglucoses was obtained. This mixture of polymers was found to be readily soluble in water. In order to eliminate the remaining water and to complete the polymerization, the mixture of polyglucose recovered from the drum dryer was powdered and dried for five days over phosphorus pentoxide under a reduced pressure less than 0.8 mm. Hg at room temperature.

One hundred (100) grams of the mixture of branched-chain polyglucoses obtained from the drum drying process and drying over phosphorus pentoxide was dissolved in 100 cc. of water containing enough sodium bicarbonate to neutralize the retained concentrated hydrochloric acid. The pH was maintained between 7 and 8 during this treatment in order to avoid acid hydrolysis of the polyglucoses. A thin stream of the solution of polyglucoses was added to 5000 cc. of anhydrous methanol which was violently agitated during the admixture and maintained at room temperature. Fifty-six grams of a white precipitate separated which consisted of a mixture of polyglucoses having an average molecular weight of about 3000. This precipitate was washed with anhydrous methanol, dried under vacuum at room temperature and a fluffy white powder of a mixture of polyglucoses of the same molecular weights was recovered. One hundred (100) grams of such a powder made by the above procedures was dissolved in 100 cc. of water and the solution at a temperature of 45° C. was introduced in a thin stream at a regular rate into 1000 cc. of anhydrous methanol which was violently agitated and maintained at 45° C. Simultaneously, 3750 cc. of anhydrous methanol at 45° C. was introduced into the same reaction vessel at a different regular rate so that the two streams were continuously added together and the additions were completed approximately simultaneously. A white powder precipitate of 58 grams of a mixture of polyglucoses was obtained which was filtered, washed with anhydrous methanol and dried under vacuum. This second fraction of branched chain polyglucose had an average molecular weight of about 4500.

One hundred (100) grams of the second fraction of polyglucoses was dissolved in water and poured into 200 cc. of absolute ethanol which was kept under violent agitation. A third fraction of a mixture of branched-chain poly-glucoses separated as a white powder which was filtered, washed with absolute ethanol and dried under vacuum. The mixture of polymers was recovered in an amount of 96 grams and the average molecular weight of this third fraction was about 8000.

By further and similar fractional precipitations using other non-solvents for the precipitations, e. g., n-butyl alcohol, isopropyl alcohol, n-propyl alcohol and higher homologues; ethylene glycol and mono- and dimethyl ethers of ethylene glycol, etc., and varying the amount of water and the temperature during the precipitation fractions of mixtures of polyglucoses with average molecular weights varying, for instance, from about 4,000 to 15,000 can be prepared by similar fractional precipitation methods.

*Example IV*

D-glucose (dextrose) was polymerized in the presence of concentrated hydrochloric acid in the manner described in Examples I and II. The glass-like polymer was powdered, dissolved in water, containing sufficient sodium bicarbonate to neutralize the hydrochloric acid in the polymer mixture and dialyzed through a thin regenerated cellulose bag for 10 days. The solution remaining inside the cellophane casing was concentrated under a pressure of 5 to 10 mm. Hg and a temperature below 40° C. until the polyglucose concentration reached about 50% by weight. This concentrated solution was added in the form of a thin stream into methyl alcohol which was vigorously agitated and had a volume ten times larger than the aqueous polyglucose solution. A slightly yellow-colored precipitate of polyglucose was obtained. The yield of this precipitate was 30% on the basis of the weight of the glucose from which the whole preparation was started. The fraction was washed with absolute methanol then with diethyl ether and dried. This fraction had a polymerization degree of 42 (determined by osmotic pressure measurements) and its structure was determined as follows:

Methylation of this fraction of polyglucose was carried out first by the dimethyl sulfate method under an atmosphere of nitrogen. Fifty grams of the polyglucose was dissolved in 200 cc. of water at room temperature. Sodium hydroxide (30% solution) was added dropwise and after about 20 cc. had been added dimethyl sulfate was also added with stirring, until a total of 1500 cc. of 30% sodium hydroxide and 500 cc. of dimethyl sulfate had been added over a 16-hour period. The solution was maintained on the alkaline side during this addition. The temperature then was raised to 100° C. for ten minutes. The solution was cooled to 0° C. and adjusted to pH 5 with dilute sulfuric acid. During the neutralization the methylated polyglucose separated as an elastic solid. Chloroform was used to extract the remaining material from the solution. After methylating with dimethyl sulfate similarly three times, the methoxyl content of the polyglucose was 38.2%. Further methylation was carried out as follows: Fifty grams of the partially methylated polyglucose was dissolved in 200 cc. of methyl iodide. Ten grams of dry silver oxide was added and the polyglucose mixture was refluxed for four hours. Then 10 grams of additional silver oxide was added every four hours and refluxing continued for 24 hours. The polyglucose mixture was filtered and the methyl iodide evaporated. The remaining solid, methylated polyglucose had a methoxyl content of 42.70%. After repeating the similar methylation three more times with methyl iodide as above the methoxyl content remained constant at 42.58%. The methylated polyglucose was very slightly soluble in cold water and insoluble in warm water.

The methanolysis of the methylated polyglucose product was carried out in approximately 1% solution in methyl alcohol containing 4% hydrogen chloride at 135–140° C. for 10 hours. Other methanolysis experiments were carried out at lower temperature, refluxing 500 cc. of methyl alcohol solution, which contained 5 grams of methylated polyglucose and hydrogen chloride for about 32 hours. After the methanolysis the methyl alcohol solution was neutralized with barium carbonate and evaporated. A mixture of the methyl-methyl glucosides remained.

This mixture of the methyl-methyl glucosides was subjected to fractional distillation at a pressure of $10^{-4}$ mm. Hg. Fractions of tetra-, tri- and dimethylmethyl glucosides were collected and their amounts estimated after determining the methoxyl content and the refractive index of each fraction. It was estimated by this method that approximately 13% of tetramethylmethyl glucoside, 56% of different trimethyl-methyl glucosides, 25% of dimethyl-methyl glucosides and 6% of monomethyl-methyl glucosides were present in the mixture. The identity of the 2,3,4,6-tetramethyl-methyl glucoside, 2,3,6-, 2,4,6- and 3,4,6-trimethyl-methyl glucoside was ascertained by obtaining their crystalline derivatives and comparing these crystalline derivatives with authentic samples and also by paper partition chromatographic evidence. Paper chromatography showed the presence of more than one dimethyl glucose and several monomethyl glucoses after hydrolyzing the methyl-methyl glucosides with 0.5 N sulfuric acid at 100° C. for six hours, and the 3,6-dimethyl glucose was identified. The hydroxyls which took part in the formation of the polymer could not be methylated. The isolation of large quantities of different dimethyl and monomethyl glucose derivatives in these experiments indicated that a large number of glucose molecules were the starting points for three- and four-way branched-chains and the identified methyl glucosides also indicated on which hydroxyl groups the condensation occurred.

Periodic acid oxidizes neighboring hydroxyls to di-aldehydes and if more than two vicinal hydroxyl groups are available the oxidation continues through this portion of the molecule with the consumption of more periodic acid and with the formation of formic acid from the secondary alcoholic groups. Periodic acid oxidation was carried out in the aqueous polyglucose solution and if we consider the volume of the periodic acid which was recovered after different time intervals the results indicate the same number of 3-way and 4-way branching at the same hydroxyls of the glucose molecules as in the above methylation.

The analysis of the methylated polyglucose and periodic acid oxidation shows that the polyglucose has a very highly branched structure where practically every type of hemiacetal, acetal or ether linkage is present including approximately 25% of 3-way branching and 6% of 4-way branching.

Hydrolysis experiments were done on the polyglucose determining the changes in reducing power, and optical rotation by time and by the isolation in quantitative yield at the end of the hydrolysis of a crystalline derivative of the glucose the so-called glucosazone. These hydrolysis experiments prove that the polyglucose consists of essentially undecomposed glucoses and are in agreement with the results of the methylation and the periodic acid oxidation experiments concerning the structure of the polyglucose.

The aqueous solution of the polyglucose remains unaffected for ten days by the following carbohydrate splitting enzymes: $\alpha$-amylase, $\beta$-amylase, invertase, salivary enzymes, yeast, aspergillus niger and hemicellulase. This is further evidence that the linkages occurring in the chemically synthesized polyglucose are of a highly branched-chain structure and differ from those occurring in the natural polysaccharides.

*Example V*

Ten (10) grams of D-glucose (dextrose) was dissolved in 10 cc. of water and three drops of concentrated hydrochloric acid was added. This solution was evaporated at room temperature at a pressure of $10^{-1}$ mm. Hg for a period of about 24 hours whereby a solid glass-like foam was formed. The foam was dried for two more days at a pressure of $10^{-3}$ mm. Hg in the presence of phosphoric anhydride. A brittle, glass-like hygroscopic polyglucose was recovered having a molecular weight in excess of 6500 and a polymerization degree of 40. This polyglucose was dissolved in water and it was found that it did not resemble D-glucose because it had practically no reducing action on Fehling's solution. The slow migration in a paper chromatogram indicated that a high polymer was formed. When this polyglucose was hydrolyzed with boiling dilute hydrochloric acid the solution reduced the Fehling reagent and crystalline glucosazone and glucose were recovered in a quantitative yield.

In place of the D-glucose in the foregoing examples there may be substituted various other unsubstituted saccharides and substituted saccharides having the above characteristics with similar results. Each of such saccharides yields highly-branched polymers of high molecular weight. The invention is not limited to the polymerization of a saccharide or a mixture of saccharides having the above characteristics, as up to 30% of lower saccharides having two free hydroxyls and 3 to 7 carbon atoms in the saccharide units, e. g., 2,3,4,6-tetramethyl glucose and 2,3,4-triacetyl-6-nitro glucose can be added and copolymerized therewith. The process conditions described above are also useful for polymerizing saccharides in general which contain two or more reactive groups, e. g., free hydroxyl groups or hydroxyl-yielding groups, e. g., hemiacetal, acetal or ether groups. Such saccharides can be polymerized alone or in admixture with saccharides containing three or more reactive groups. The fractional separations are applicable to the resulting polymers.

While water has been described as the solvent or diluent in the foregoing examples the processes of this invention are not limited to that medium. In place of the water or in addition to it there may be used dioxane, benzene, toluene, propane, butane and higher homologues and mixtures of such solvents, acetone, chlorinated hydrocarbons such as chloroform.

The novel branched-chain polysaccharides of this invention and particularly those from unsubstituted sacchardies containing 6-carbon atoms in the saccharide units can be used for formulation work in pharmacology.

An advantage of the novel polymerization processes described above is that they provide a simple and practical method of producing a class of highly-branched-chain polysaccharides which are new. A further advantage resides in the fact that very high molecular weight polysaccharides can readily be prepared. A still further advantage is that the process results in a very high conversion of the saccharides to branched-chain super polysaccharides and in some cases the yields are practically quantitative. Another advantage of the invention is that the polysaccharides and particularly the polyglucoses of this invention are very stable in solid form as well as in neutral and mildly alkaline solutions. Yet another advantage resides in the fact that the polysaccharide solutions can be sterilized by heating them for a short period. The polysaccharides, moreover, are practically uneffected by micro-organisms or enzymes even after prolonged contact with air.

As many widely different embodiments of this invention can be made without departing from the spirit and scope thereof, it is to be understood that the invention is not to be limited except as defined by the claims.

What is claimed is:

1. A process of preparing higher polysaccharides which comprises heating a saccharide having from 1 to 10 saccharide units of 4 to 7 carbon atoms in a linear chain and containing at least three reactive radicals wherein two of the radicals are free hydroxyl groups and one of the radicals is taken from the class consisting of hydroxyl, hemiacetal, acetal and ether groups, at a temperature from $-80°$ C. to $110°$ C. and a pressure of $10^{-5}$ to 100 mm. of mercury in a liquid medium in the presence of an acid catalyst and recovering the polysaccharides which form.

2. A process of preparing branched-chain polysaccharides which comprises heating a saccharide having from 1 to 10 saccharide units of 4 to 7 carbon atoms in a linear chain and containing at least three reactive radicals wherein two of the radicals are free hydroxyl groups and one of the radicals is taken from the class consisting of hydroxyl, hemiacetal, acetal and ether groups, at a temperature from $-80°$ C. to $110°$ C. and a pressure of $10^{-5}$ to 100 mm. of mercury in a liquid medium for a period of at least 1 minute in the presence of an acid catalyst and removing the volatile materials from the branched-chain polysaccharides which form.

3. A process of preparing branched-chain polysaccharides which comprises heating a saccharide having from 1 to 10 saccharide units of 4 to 7 carbon atoms in a linear chain and containing at least three reactive radicals wherein two of the radicals are free hydroxyl groups and one of the radicals is taken from the class consisting of hydroxyl, hemiacetal, acetal and ether groups, at a temperature from $-80°$ C. to $110°$ C. and a pressure of $10^{-5}$ to 100 mm. of mercury in an aqueous solution for a period of at least 1 minute in the presence of a Lewis acid catalyst and removing the volatile materials from the branched-chain polysaccharides which form.

4. A process of preparing branched-chain polysaccharides which comprises heating a saccharide having from 1 to 10 saccharide units of 4 to 7 carbon atoms in a linear chain and containing at least three reactive radicals wherein two of the radicals are free hydroxyl groups and one of the radicals is taken from the class consisting of hydroxyl, hemiacetal, acetal and ether groups, at a temperature from —80° C. to 110° C. and a pressure of $10^{-5}$ to 100 mm. of mercury in an organic solvent for a period of at least 1 minute in the presence of a Lewis acid catalyst and removing the volatile materials from the branched-chain polysaccharides which form.

5. A process of preparing higher polysaccharides which comprises heating a saccharide having from 1 to 10 saccharide units of 4 to 7 carbon atoms in a linear chain and containing at least three reactive radicals wherein two of the radicals are free hydroxyl groups and one of the radicals is taken from the class consisting of hydroxyl, hemiacetal, acetal and ether groups, at a temperature from —80° C. to 110° C. and a pressure of $10^{-5}$ to 100 mm. of mercury in a liquid medium in the presence of hydrochloric acid and recovering the polysaccharides which form.

6. A process of preparing branched-chain polysaccharides which comprises heating a saccharide having from 1 to 10 saccharide units of 4 to 7 carbon atoms in a linear chain and containing at least three reactive radicals wherein two of the radicals are free hydroxyl groups and one of the radicals is taken from the class consisting of hydroxyl, hemiacetal, acetal and ether groups, at a temperature from —80° C. to 110° C. and a pressure of $10^{-5}$ to 100 mm. of mercury in a liquid medium for a period of at least 1 minute in the presence of an acid catalyst and removing the volatile materials from the branched-chain polysaccharides which form, recovering a mixture of branched-chain polysaccharides and separating said mixture into higher molecular weight fractions of such polysaccharides.

7. A process as set forth in claim 6 wherein the separation is accomplished by fractional precipitation.

8. A process as set forth in claim 6 wherein the separation is accomplished by dialysis.

9. The process of preparing branched-chain polysaccharides which comprises heating a monosaccharide containing 6 carbon atoms and at least 5-hydroxyl groups at a temperature from —80° C. to 110° C. and a pressure of $10^{-5}$ to 100 mm. of mercury for a period of at least 1 minute in a liquid medium and in the presence of an acid catalyst and removing the volatile materials from the branched-chain polysaccharides which form.

10. A process as set forth in claim 5 wherein said saccharide is D-glucose.

11. A process as set forth in claim 5 wherein said saccharide is D-mannose.

12. A process as set forth in claim 6 wherein said saccharide is D-galactose.

13. The process which comprises heating maltose at a temperature from —80° C. to 110° C. and a pressure of $10^{-5}$ to 100 mm. of mercury for a period of at least 1 minute in a liquid medium in the presence of an acid catalyst and removing water and acid from the branched-chain polymaltose which forms.

14. The process which comprises heating cellobiose at a temperature from —80° C. to 110° C. and a pressure of $10^{-5}$ to 100 mm. of mercury for a period of at least 1 minute in a liquid medium in the presence of an acid catalyst and removing water and acid from the branched-chain polycellobiose which forms.

15. A process which comprises heating an aqueous solution of D-glucose at a temperature from 92° C. to 96° C., at a pressure from 1 to 6 mm. of mercury for a period of 1 to 3 minutes in the presence of an acid catalyst, evaporating the water from the mixture of polyglucoses which form, neutralizing the acid and separating the polyglucoses into a high molecular weight fraction of polyglucoses.

16. A process as set forth in claim 15 wherein said acid is concentrated hydrochloric acid.

17. A process as set forth in claim 16 wherein said separation is accomplished by fractional precipitation.

18. A mixture of polysaccharides having highly branched chain structures wherein the linkages 1-2, 1-3, 1-4, and 1-6 occur, said polysaccharides having an average molecular weight of at least 3240 and their molecules possessing a spherical configuration and said polysaccharides being further characterized in that they are prepared from a saccharide having from 1 to 10 saccharide units of 4 to 7 carbon atoms in a linear chain and containing at least three reactive radicals wherein two of the radicals are free hydroxyl groups and one of the radicals is taken from the class consisting of hydroxyl, hemiacetal, acetal and ether groups, by a process which comprises heating said saccharide at a temperature of from —80° C. to 110° C. and a pressure of $10^{-5}$ to 100 mm. of mercury in a liquid medium in the presence of an acid catalyst.

19. A mixture of polysaccharides wherein each molecule has a highly branched chain structure and consists of linked saccharide units of six carbon atoms, characterized in that the 1-carbon atom of a saccharide unit is joined by means of an oxygen atom to one of the 2-, 3-, 4-, and 6-carbon atoms of an adjacent saccharide unit, and a substantial proportion of the saccharide units are, in addition, at least 3-way branched to third and fourth saccharide units by an oxygen atom at any of the remaining 1-, 2-, 3-, 4-, and 6-carbon atoms, a substantial proportion of the saccharide units being joined through at least one of the 2- and 3-carbon atoms to adjacent saccharide units, said polysaccharides having an average molecular weight of at least 3240 and capable of being hydrolyzed completely to the original saccharide and said polysaccharides being further characterized in that they are prepared from a saccharide having from 1 to 10 saccharide units of 4 to 7 carbon atoms in a linear chain and containing at least three reactive radicals wherein two of the radicals are free hydroxyl groups and one of the radicals is taken from the class consisting of hydroxyl, hemiacetal, acetal and ether groups, by a process which comprises heating said saccharide at a temperature of from —80° C. to 110° C. and a pressure of $10^{-5}$ to 100 mm. of mercury in a liquid medium in the presence of an acid catalyst.

20. A mixture of polysaccharides wherein each molecule has a highly branched chain structure and consists of linked saccharide units of six carbon atoms, characterized in that the 1-carbon atom of a saccharide unit is joined by means of an oxygen atom to one of the 2-, 3-, 4-, and 6-carbon atoms of an adjacent saccharide unit, and a substantial proportion of any of the units are, in addition, at least 3-way branched to third and fourth saccharide units by an oxygen atom at any of the remaining 1-, 2-, 3-, 4-, and 6-carbon atoms, a substantial proportion of the saccharide units being joined through at least one of the 2- and 3-carbon atoms to adjacent saccharide units, said polysaccharides having an average molecular weight of at least 8100 and capable of being hydrolyzed completely to the original saccharide and said polysaccharides being further characterized in that they are prepared from a saccharide having from 1 to 10 saccharide units of 4 to 7 carbon atoms in a linear chain and containing at least three reactive radicals wherein two of the radicals are free hydroxyl groups and one of the radicals is taken from the class consisting of hydroxyl, hemiacetal, acetal and ether groups, by a process which comprises heating said saccharide at a temperature of from —80° C. to 110° C. and a pressure of $10^{-5}$ to 100 mm. of mercury in a liquid medium in the presence of an acid catalyst.

21. A mixture of poly-D-glucoses wherein each molecule has a highly branched chain structure and consists of linked glucose units, characterized in that the 1-carbon atom of a D-glucose unit is joined by means of an oxygen atom to one of the 2-, 3-, 4-, and 6-carbon atoms of an adjacent D-glucose unit and a substantial proportion of the D-glucose units are at least 3-way branched to third and fourth D-glucose units by an oxygen atom at any of the remaining 1-, 2-, 3-, 4-, and 6-carbon atoms, a substantial proportion of the D-glucose units being joined through at least one of the 2- and 3-carbon atoms to adjacent saccharide units, said poly-D-glucoses having an average molecular weight of at least 3240 and being capable of being hydrolyzed completely to D-glucose, and said poly-D-glucoses being further characterized in that they are prepared from D-glucose by a process which comprises heating D-glucose at a temperature from $-80°$ C. to 110° C. and a pressure of $10^{-5}$ to 100 mm. of mercury in a liquid medium in the presence of an acid catalyst.

22. A mixture of poly-D-glucoses wherein each molecule has a highly branched chain structure and consists of linked glucose units, characterized in that the 1-carbon atom of a D-glucose unit is joined by means of an oxygen atom to one of the 2-, 3-, 4-, and 6-carbon atoms of an adjacent D-glucose unit, and a substantial proportion of the D-glucose units are at least 3-way branched to third and fourth D-glucose units by an oxygen atom at any of the remaining 1-, 2-, 3-, 4-, and 6-carbon atoms, a substantial proportion of the D-glucose units being joined through at least one of the 2- and 3-carbon atoms to adjacent saccharide units, said poly-D-glucoses having an average molecular weight of at least 8100 and capable of being hydrolyzed completely to D-glucose, and said poly-D-glucoses being further characterized in that they are prepared from D-glucose by a process which comprises heating D-glucose at a temperature from $-80°$ C. to 110° C. and a pressure of $10^{-5}$ to 100 mm. of mercury in a liquid medium in the presence of an acid catalyst.

23. A mixture of poly-D-glucoses wherein each molecule has a highly branched chain structure and consists of linked glucose units, characterized in that the 1-carbon atom of a D-glucose unit is joined by means of an oxygen atom to one of the 2-, 3-, 4-, and 6-carbon atoms of an adjacent D-glucose unit, and a substantial proportion of any of the D-glucose units are at least 3-way branched to third and fourth D-glucose units by an oxygen atom at any of the remaining 1-, 2-, 3-, 4-, and 6-carbon atoms, a substantial proportion of the D-glucose units being joined through at least one of the 2- and 3-carbon atoms to adjacent saccharide units, said poly-D-glucoses having an average molecular weight of at least 25,000 and capable of being hydrolyzed completely to D-glucose, and said poly-D-glucoses being further characterized in that they are prepared from D-glucose by a process which comprises heating D-glucose at a temperature from $-80°$ C. to 110° C. and a pressure of $10^{-5}$ to 100 mm. of mercury in a liquid medium in the presence of an acid catalyst.

24. An aqueous solution containing a mixture of polysaccharides having highly branched chain structures wherein the linkages 1-2, 1-3, 1-4, and 1-6 occur, said polysaccharides having an average molecular weight of at least 3240 and said polysaccharides being further characterized in that they are prepared from a saccharide having from 1 to 10 saccharide units of 4 to 7 carbon atoms in a linear chain and containing at least three reactive radicals wherein two of the radicals are free hydroxyl groups and one of the radicals is taken from the class consisting of hydroxyl, hemiacetal, acetal and ether groups, by a process which comprises heating said saccharide at a temperature of from $-80°$ C. to 110° C. and a pressure of $10^{-5}$ to 100 mm. of mercury in a liquid medium in the presence of an acid catalyst.

25. An aqueous solution containing a mixture of poly-D-glucoses wherein each molecule has a highly branched chain structure and consists of linked glucose units, characterized in that the 1-carbon atom of a D-glucose unit is joined by means of an oxygen atom to one of the 2-, 3-, 4-, and 6-carbon atoms of an adjacent D-glucose unit and a substantial proportion of the D-glucose units are at least 3-way branched to third and fourth D-glucose units by an oxygen atom at any of the remaining 1-, 2-, 3-, 4-, and 6-carbon atoms, a substantial proportion of the D-glucose units being joined through at least one of the 2- and 3-carbon atoms to adjacent saccharide units, said poly-D-glucoses having an average molecular weight of at least 3240 and being capable of being hydrolyzed completely to D-glucose, and said poly-D-glucoses being further characterized in that they are prepared from D-glucose by a process which comprises heating D-glucose at a temperature from $-80°$ C. to 110° C. and a pressure of $10^{-5}$ to 100 mm. of mercury in a liquid medium in the presence of an acid catalyst.

26. A process which comprises the step of heating a carbohydrate having 1 to 10 saccharide units of from 4 to 7 carbon atoms in a continuous chain, a substantial fraction of said units containing at least 3 reactive radicals wherein 1 of the reactive radicals is taken from the class consisting of glycosidic hydroxyl and acetal and the remaining reactive radicals are taken from the class of hydroxyl radicals consisting of primary carbinol type hydroxyls and secondary carbinol type hydroxyl groups, in the presence of an acid catalyst and at a temperature of from $-80°$ C. to about 110° C. and a pressure of $10^{-5}$ to 100 millimeters of mercury to produce a mixture of high molecular weight random and multi-branched polysaccharides capable of being hydroyzed to the monosaccharide unit.

References Cited in the file of this patent

UNITED STATES PATENTS

| 2,375,564 | Leuck | May 8, 1945 |
| 2,387,275 | Leuck | Oct. 23, 1945 |
| 2,400,423 | Leuck | May 14, 1946 |
| 2,565,507 | Lockwood et al. | Aug. 28, 1951 |

OTHER REFERENCES

McIlroy: Chemistry of the Polysaccharides, pp. 14, 15, 28–30 (1948).

Ivy et al.: Article in Surg. Gyn. & Obst., January 1943, pp. 85 to 90.